United States Patent [19]

Stanciu

[11] 3,841,813

[45] Oct. 15, 1974

[54] WAX INJECTION NOZZLE WITH RELIEF RESERVOIR

[75] Inventor: Virgil V. Stanciu, Rocky River, Ohio

[73] Assignee: Tempcraft Tool & Mold, Inc., Cleveland, Ohio

[22] Filed: Oct. 6, 1972

[21] Appl. No.: 295,492

[52] U.S. Cl.............. 425/159, 425/145, 425/166, 425/245, 425/247, 425/DIG. 224, 425/DIG. 225
[51] Int. Cl............................................. B29f 1/03
[58] Field of Search ............ 425/145, 159, 166, 244, 425/245, 247, 248, 251, 245 NS, DIG. 224, DIG. 225, DIG. 227, DIG 4, DIG. 812; 222/252, 280, 255

[56] References Cited
UNITED STATES PATENTS

| | | | |
|---|---|---|---|
| 2,461,723 | 2/1949 | Cowan | 425/242 |
| 3,026,567 | 3/1962 | Scott | 425/DIG. 224 |
| 3,121,257 | 2/1964 | Scott | 425/DIG. 224 |
| 3,271,491 | 9/1966 | Mikkelborg | 164/45 X |
| 3,501,810 | 3/1970 | Powell | 425/245 X |
| 3,612,147 | 10/1971 | Kaplan | 164/45 |
| 3,709,644 | 1/1973 | Farrell | 425/245 X |

FOREIGN PATENTS OR APPLICATIONS

| | | | |
|---|---|---|---|
| 392,059 | 9/1965 | Switzerland | 425/244 X |

Primary Examiner—Robert D. Baldwin
Assistant Examiner—David B. Smith
Attorney, Agent, or Firm—Baldwin, Egan, Walling & Fetzer

[57] ABSTRACT

A nozzle structure is provided for injecting hot wax into a die or mold. The nozzle structure comprises a generally tubular housing, an intermediate portion of which is submerged in a storage reservoir of hot wax with the discharge end of the housing extending beyond the reservoir. The hot wax in the storage reservoir is under pressure and when the nozzle plug is in open position, the hot wax flows directly from the reservoir through the valve in the nozzle plug to fill the die or mold. At the end of the injection operation, the valve plug is moved toward closed position and the present invention facilitates a rapid closing of such valve plug by providing a pressure relief reservoir mounted adjacent the outlet end of the housing and communicating through the housing adjacent the discharge or outlet end thereof in position to receive hot wax propelled by the valve plug near the end of its closing movement.

7 Claims, 5 Drawing Figures 3,841,813

WAX INJECTION NOZZLE WITH RELIEF RESERVOIR

BACKGROUND OF THE INVENTION

My U.S. Pat. No. 3,632,259, granted Jan. 4, 1972, attacked the same problem which forms the subject matter of the present invention. In this prior patent, a valve plug and coacting seat were complementary generally frusto-conical surfaces converging toward the discharge outlet and an escape passageway 33 was provided to allow for the escape of hot wax which would otherwise be trapped between the valve plug and the coacting valve seat as the valve closed. In this prior patent, this escape passageway took the form of a shallow segment cut out of the frusto-conical surface of the valve plug, this cut providing a substantially planar surface in the plane of the chord of this segment extending from a point adjacent the outlet of the housing back to a point where hot wax entered the housing from the wax storage reservoir.

The object of this invention is to provide a quick relief of hot wax which would otherwise be trapped between a wax injection flow control valve as it approaches its complementary seat as it nears a closed position of the valve plug. This is done by providing a pressure relief reservoir mounted adjacent the outlet end of the valve housing and having a bore communicating through the housing adjacent the outlet or discharge end thereof in position to receive hot wax propelled by the valve plug near the end of its closing movement.

Another object of the invention is to provide an automatic control whereby the relief reservoir is purged of the wax collected therein just before the final closing of the plug valve against its coacting seat, but while there is still an open passageway for the hot wax to return to a wax storage reservoir.

Other objects and advantages of the present invention will be set forth in the accompanying drawings and specification and the essential features thereof will be set forth in the appended claims.

In the drawings,

FIG. 4 is a diagram illustrating the automatic control for the operation of the injection control valve and the purging device for the relief reservoir of this invention; while

Figure 1:
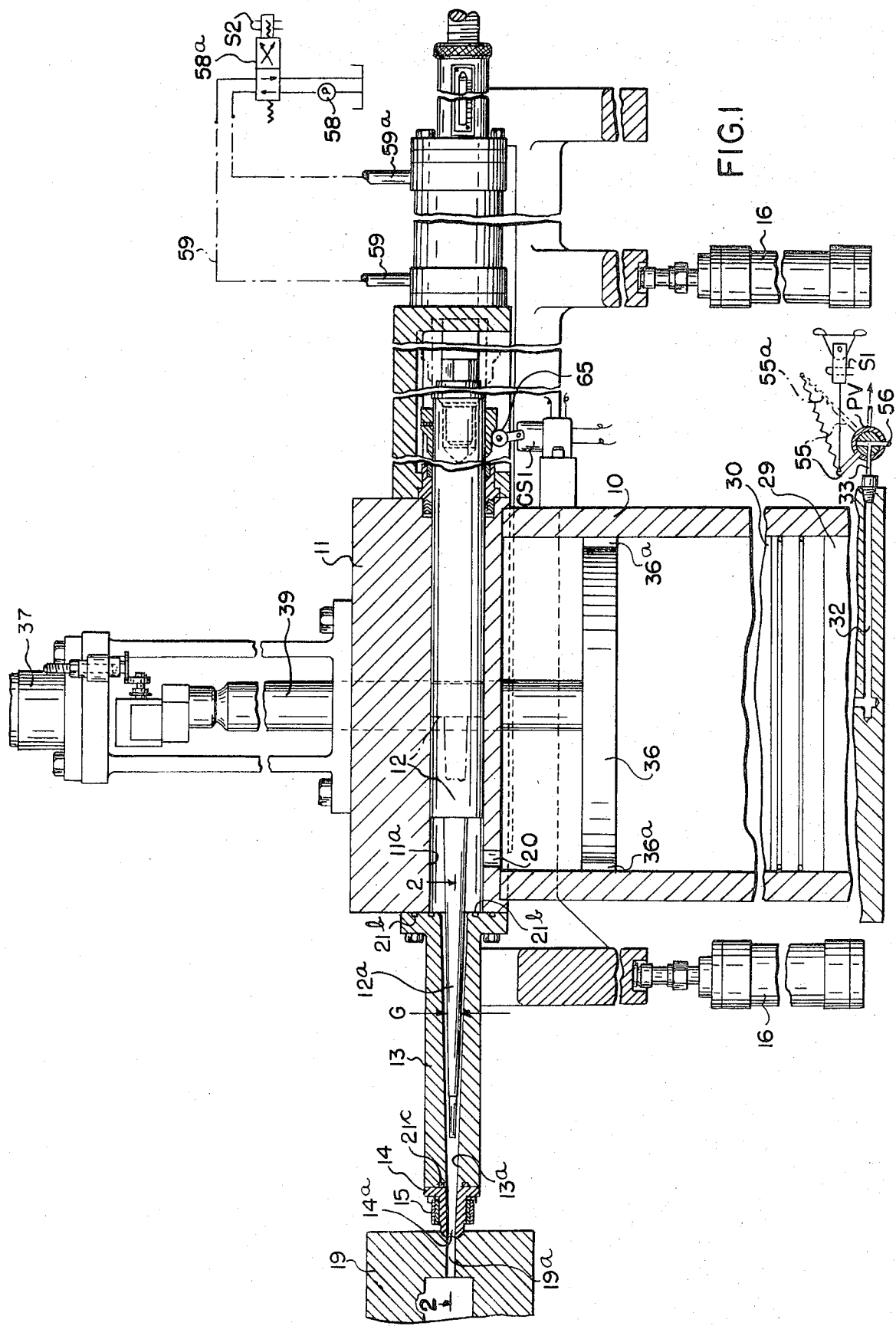
FIG. 1 is a central sectional view through a hot wax storage reservoir in which is mounted a housing containing an injection control valve as used in the present invention.

I have chosen to describe this invention utilizing a storage reservoir for hot wax in substantially all respects like that shown in U.S. Pat. No. 3,535,743, granted Oct. 27, 1970 to Virgil V. Stanciu and Jack R. Peshek. In that patent, as here, a heated cylindrical wax storage reservoir 10 has an agitator 36 which is reciprocated vertically by an hydraulic jack 37 connected with the agitator by a rod 39. Openings 36a around the periphery of the agitator allow the continuous agitation of the hot wax so that the temperature throughout the storage reservoir is substantially uniform. A piston structure 29, 30 in the lower portion of the reservoir is urged upwardly by pressure fluid introduced at 32, 33 so as to place the hot wax in the storage reservoir under sufficient pressure so that when the wax injection control valve is opened, the wax flows through opening 20 to inject the die or mold 19 through its gate 19a. The opening 20 shown here performs the same function as the opening 20 in my U.S. Pat. No. 3,632,259.

Figure 5:
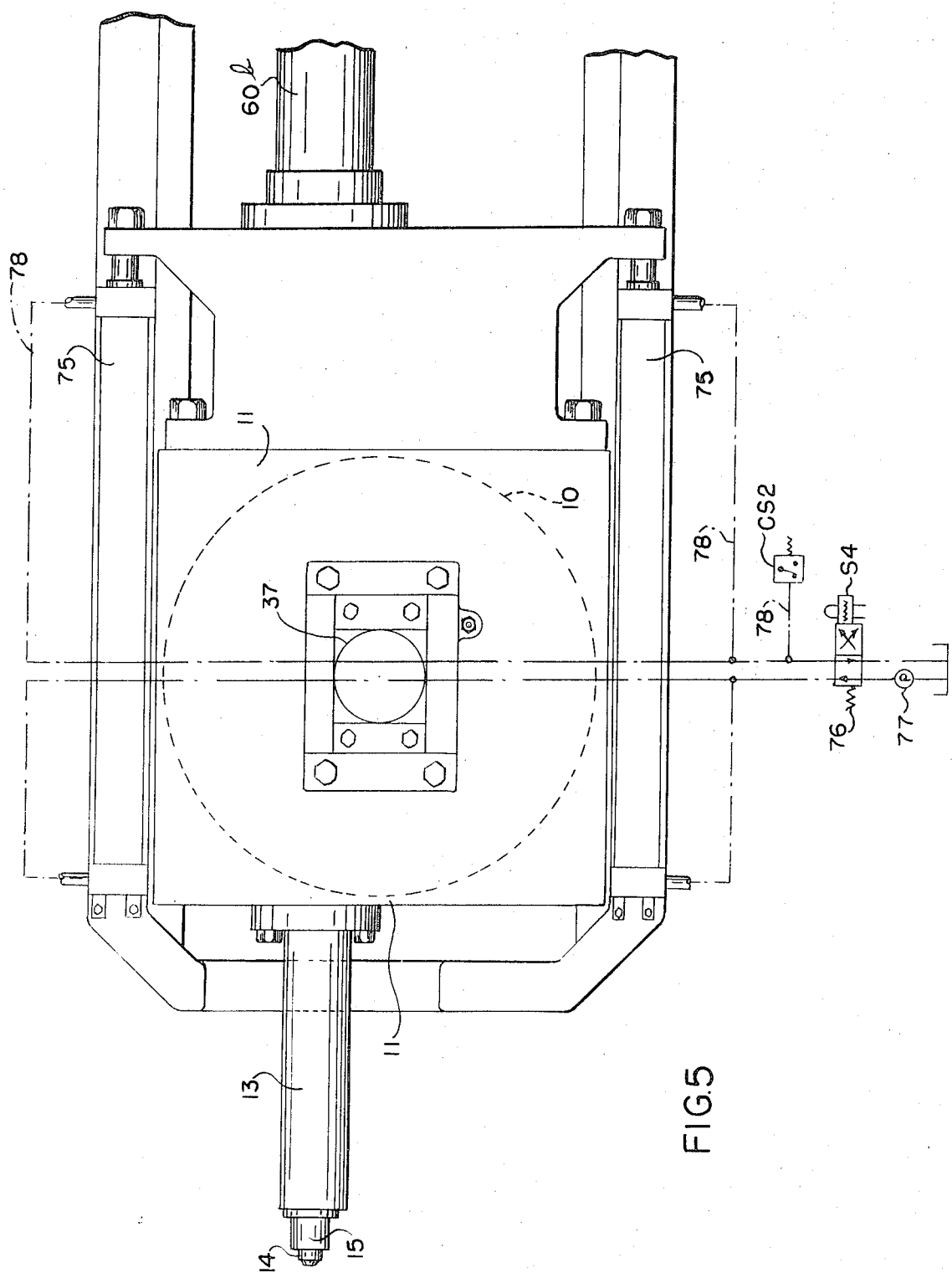
FIG. 5 is a plan view of the injection housing showing the hydraulic jacks which maintain contact between the injection nozzle and the die being injected.

The reservoir 10 is closed at the top by a head 11 through which extends a cylindrical opening 11a which provides the housing for the wax injection control valve 12. A valve seat extension 13 is bolted to the head 11 and has a central longitudinally extending frusto-conical opening 13a which is concentric with the housing opening 11a and forms a valve seat complementary to the frusto-conical extension 12a of the plug 12. At the outlet end of the member 13, a nozzle 14 is rigidly secured and is equipped with suitable heating elements as shown at 15. When an injection is to be performed, the nozzle 14a is properly aligned on a vertical level with the gate 19a of the mold or die by means of suitable hydraulic jacks 16, and is maintained in contact with the gate by hydraulic jacks 75 as shown in FIG. 5.

Figure 2:
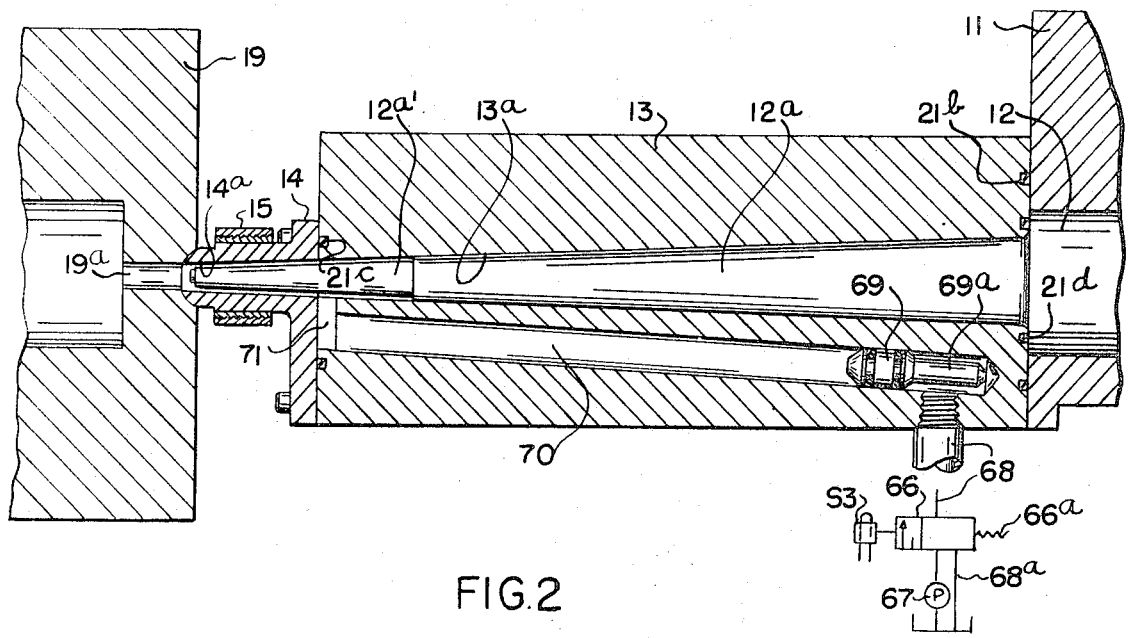
FIG. 2 is an enlarged fragmental sectional view taken on the line 2—2 of FIG. 1 and showing the control valve in closed position.
Figure 3:
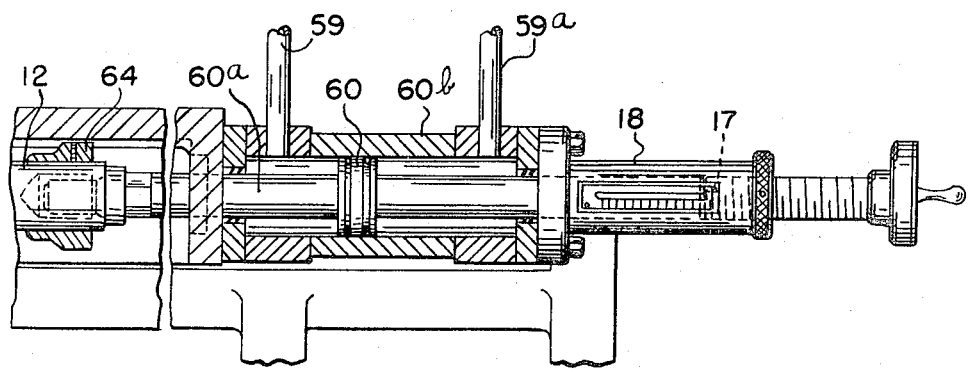
FIG. 3 is a central sectional view, enlarged, showing the fluid controlled piston which reciprocates the injection control valve.

As best seen in FIG. 3, the valve plug 12 is reciprocated in its housing from the full line position of FIG. 2 to the dot-dash portion of FIG. 1 by a rearwardly extending rigid piston rod 60a which carries a piston 60 which is reciprocatable in hydraulic cylinder 60b which is supplied by pressure fluid thorugh conduits 59 and 59a as will later be described. The movement of the piston rod 60a toward the right as viewed in FIGS. 1 and 3 is limited by a stop 17 which is adjustable longitudinally by a threaded connection with the housing extension 28. Leakage of hot wax out of the cylindrical housing opening 11a is prevented by sealing means at 21a, 21b and 21c.

As best seen in FIG. 2, a pressure relief reservoir 70 is provided rigid with the housing extension 13 and communicating through a bore 71 with the housing passageway adjacent the outlet or discharge end thereof in position to receive hot wax propelled by the valve extension 12a near the end of its closing movement. Note that the tip of the valve is slightly undercut at 12a' close to the discharge end of the housing passageway so that there is always an open communication with the bore 71.

Means is provided for purging the hot wax in the relief reservoir 70 at the desired moment. The passageway 70 is generally cylindrical and fitted therein is a piston 69 which is sealed against the walls of the passageway 70 and which has a projection 69a on the end opposite the hot wax contact, the same being of lesser diameter than the passageway 70 so as to permit the introduction of pressure fluid there as will be hereinafter described.

Figure 4:
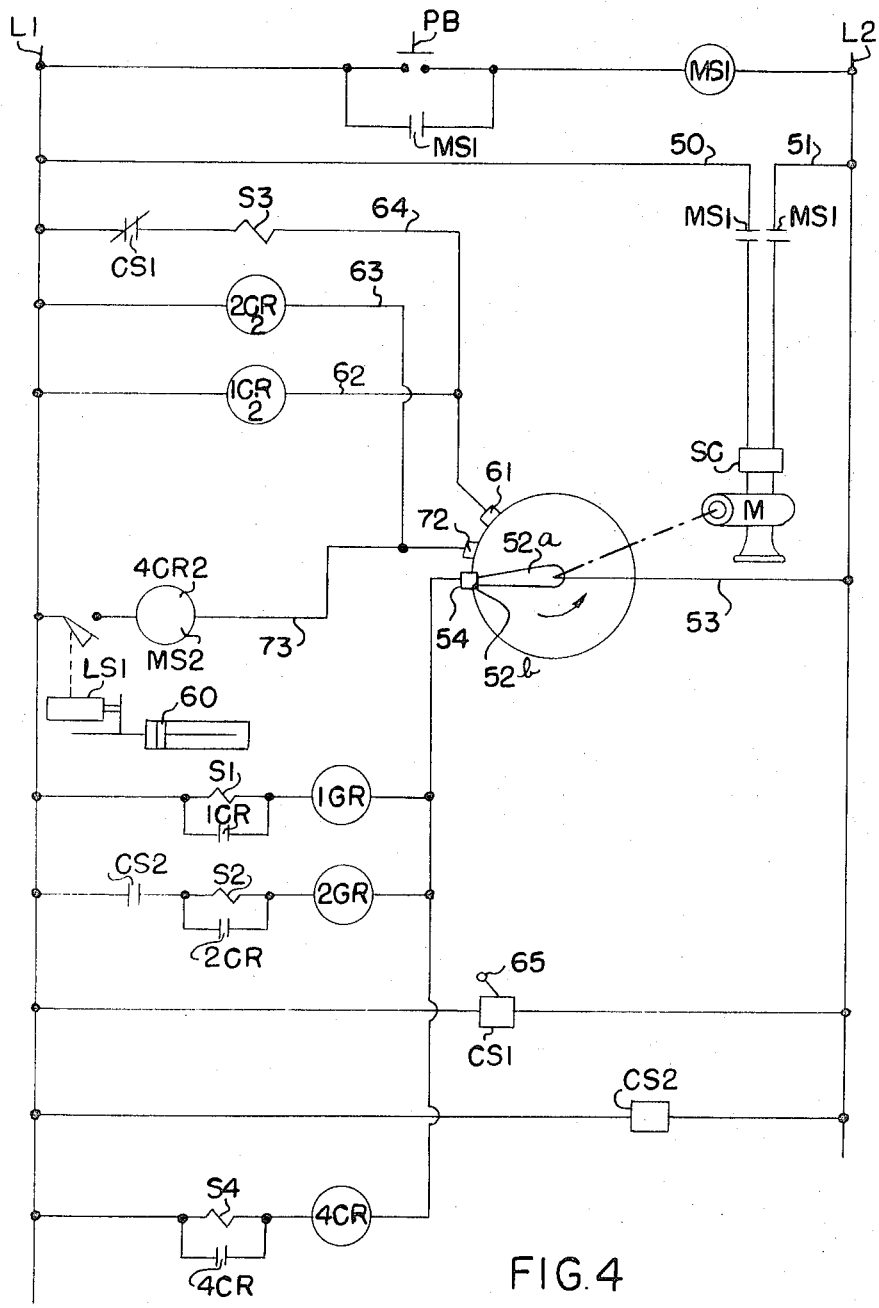

The automatic operation of the wax injection apparatus is as follows:

Referring to FIG. 4, the operator presses the push button PB which energizes the relay MS which closes the contacts MS1 bypassing the push button so as to hold the circuit energized. At the same time, the relay closes the contacts MS1 in the lines 50 and 51 leading to motor M which is then energized through its speed control SC. The drive shaft of this motor rotates an arm 52a of timer 52 in the direction of the arrow. Energizing current is conducted through line 53 and arm 52a to contact 52b to energize circuits in sequence as follows. The first contact energized is 54 which energizes relay 1CR and colenoid S1 and at the same time closes the contacts 1CR so as to hold the circuit. The solenoid S1 is seen diagrammatically in FIG. 1 and opens pressure valve PV from its normally closed position, shown by arm 55 in dot-dash lines, to a position 90° counter-clockwise which is indicated by the arm 55 in full lines. This allows the flow of pressure fluid from a source not shown in line 56 through lines 33 and 32 beneath the piston 29, 30 in the hot wax storage reservoir 10, moving such piston upwardly so that hot wax under pressure is provided to the passageway 20 leading into the control valve housing previously mentioned. At the same time, contact 54 and line 57 energize solenoid S4 seen in the diagram of FIGS. 4 and 5. This circuit, when completed, moves the hydraulic valve 76 toward the left as viewed in FIG. 5 so as to provide fluid pressure from pump 77 through line 78 which causes the injection housing extension 13 and nozzle 14 to move against, and maintain pressure on, the mold gate. When this pressure reaches a predetermined point, control switch CS2 is energized. At the same time relay 4CR is energized which closes the holding contacts 4CR to maintain the circuit. When control switch CS2 is energized, normally open contacts CS2 close, energizing solenoid S2. This moves the hydraulic vlave 58a toward the left as viewed in FIG. 1 so as to provide pressure fluid from pump 58 through line 59 to the left-hand side of piston 60 as shown in FIG. 3 which causes movement of the injection control valve 12, 12a toward open position or toward the right as seen in FIG. 1. At the same time, relay 2CR is energized which closes the holding contacts 2CR to maintain the circuit. Hot wax now flows from the upper portion of the reservoir 10 through the passageway 20 in the control valve housing and past the open control valve to the nozzle opening 14a where it enters the die to be molded. This continues until the die is filled and thereafter the pressure is held until the wax in the mold solidifies sufficiently.

The timer contact 52b now reaches the contact 61 which energizes contacts 1CR, thus de-energizing solenoid S1 and permitting spring 55a to return the valve PV to closed position, thus taking the pressure off hot wax reservoir 10 and cutting off the flow of hot wax into the control valve housing. At the same time, solenoid S3 is energized through normally closed contacts CS which causes the hydraulic valve 66 to move toward the right in FIG. 2 thus causing flow of pressure fluid from the pump 57 through line 68 to cause the piston 69 in the relief reservoir to move toward the left in FIG. 2 so as to propel the hot wax from the previous injection cycle out of the relief reservoir 70 through opening 71 and backward along the still open passageway around the control valve portion 12a and opening 20 back into the hot wax reservoir 10.

The timer contact 52b now reaches the contact 72 which through line 63 energizes relay 2CR₂ which releases the holding contacts 2CR, thus de-energizing solenoid S2 causing the control valve 12 to return to the position shown in FIG. 1 which reverses the direction of piston 60 and the injection control valve 12, 12a so that it starts to close. As the control valve moves toward closed position, when the gap G indicated in FIG. 1 reaches a predetermined condition, which is set up by the cam C secured to the rear end of plug 12 by a set screw C', then at the predetermined position, the cam C engages the cam follower 65 of the cam switch CS. By this time the solenoid S3 has been energized for a sufficient length of time for the piston 69 to make a complete traverse of the relief reservoir 70 toward the left in FIG. 2 to purge the same. At this time then, the cam C energizes cam switch CS to open normally closed contacts CS de-energizing solenoid S3 and permitting the spring 66a to move the hydraulic valve 66 toward the left to the position shown in FIG. 2, to bring line 68 into communication with line 68a so as to remove the pressure fluid from the right-hand face of the piston 69. The piston 60 then continues to close injection control valve 12, 12a. From the position of valve 12, 12a in FIG. 1 to the fully closed position in FIG. 2 the valve travel can be much faster than that possible in the apparatus of U.S. Pat. No. 3,632,259 because the provision of opening 71 and relief reservoir 70 of the present invention gives the wax ahead of valve 12, 12a more room to flow. When piston 60 reaches the left-hand end of its cylinder as indicated diagrammatically in FIG. 4, it closes limit switch LS1 which completes the energizing circuit through line 73 and relay 4CR₂MS₂. This breaks the circuit through contracts 4CR de-energizing solenoid S4 causing valve 76 to return to the position shown in FIG. 5 and causing the injection housing extension 13 and nozzle 14 to move away from the die. This relay opens all of the contacts MS1, thus releasing the holding circuit established originally by push button PB and at the same time shutting down the motor M. The apparatus is then ready for another cycle.

What is claimed is:

1. In apparatus for injecting molten wax or the like into a mold or die having a gate, the combination of a storage reservoir of molten wax, means for controlling flow of said wax from said reservoir to said gate including a nozzle housing communicating with said reservoir and having an outlet adapted to be placed in communication with said gate and a valve mounted in said housing for movement between a closed and open position, a valve seat in said housing against which said valve closes, there being a passageway connected with and communicating between the wax in said storage reservoir and said outlet through said housing and past said valve in its open position, said valve and said housing providing an opening through said passageway until said valve is fully closed, a pressure relief reservoir mounted adjacent said outlet end of said housing and having a bore always communicating with said passageway through said housing adjacent said outlet in position to receive hot wax propelled by said valve near the end of its closing movement, pumping means drivingly associated with hot wax in said pressure relief reservoir for pumping wax out of said bore into said passageway, said puping means having means rendering it active when said valve is open and moving toward closed position, said pumping means rendering it inactive thereafter while said valve is still moving toward closed position, whereby said pressure relief reservoir is purged of the wax collected therein just before the final closing of said valve against its seat, means for forcing wax from said storage reservoir into said passageway, and means for causing opening and closing of said valve.

2. The combination of claim 1, wherein said means for pumping wax out of said bore includes activating means for the same responsive to the position of said valve.

3. The combination of claim 1, wherein said housing is elongated and tubular having a body portion passing through said storage reservoir and having its outlet end extending beyond said storage reservoir, a valve plug having a rear portion in sealed engagement within said tubular housing and carrying said valve at its forward portion, said valve and said seat being complementary generally frusto-conical surfaces converging toward said outlet, said frusto-conical surface of said valve of less diameter than the inside diameter of said tubular housing and movable into one end of said housing when said valve is opened, and said passageway including an opening communicating between said one end of said housing and said storage reservoir when said valve is open.

4. The combination of claim 1, wherein said bore is lineal, said means for pumping wax out of said bore includes a piston snugly slidable in said bore between its one end and where said hot wax enters and its other end, and means for alternately introducing pressure fluid at said other end to drive said piston in wax-pumping direction and for relieving the pressure of fluid to permit hot wax propelled by said valve to drive said piston in the opposite direction.

5. The combination of claim 4, including means responsive to a predetermined open position of said valve to cause said introduction of said pressure fluid at said other end.

6. The combination of claim 3, wherein said storage reservoir is cylindrical with its axis vertical, said nozzle housing being mounted at the upper end of said storage reservoir, said means for forcing wax from said storage reservoir into said passageway including a piston sealed in said cylindrical portion of said storage reservoir with hot wax above said piston up to the level of said housing and with means for introducing pressure fluid beneath said piston, and control means for (1) causing introduction of said pressure fluid beneath said piston, (2) causing opening movement of said valve, (3) adjustable timer means to maintain said valve open until said mold is filled and the wax therein has solidified and then to cause closing of said valve, and (4) means for energizing said means for forcing wax from said storage reservoir into said passageway responsive to an open position of said valve.

7. In an apparatus for injection molding of a flowable medium into a mold or die, a source of flowable medium under pressure, there being a first passageway connected with and communicating between said source and said mold, a reciprocatable flow control valve in said passageway movable between closed and open position, said first passageway having a flow opening until said valve reaches fully closed position, said valve including a seat at its discharge end against which said valve closes, an adjustable timer for maintaining said control valve open until said mold is filled and the wax therein has solidified and then to cause closing of said valve, a pressure relief reservoir mounted in said apparatus and having a second passageway always connected with and communicating at one point with said first passageway near the mold end thereof in position to receive medium propelled by said valve near the end of its closing movement, and means for purging said relief reservoir back to said first passageway at a predetermined time on said adjustable timer as said valve approaches its fully closed position during closing, said last named means ceasing its purging action and leaving said relief reservoir accessible to medium trapped ahead of said control valve as it closes.

* * * * *